United States Patent [19]
Dick et al.

[11] Patent Number: 5,179,375
[45] Date of Patent: Jan. 12, 1993

[54] INTERCONNECTION SYSTEM FOR AN ELECTRONIC CASH REGISTER

[75] Inventors: Donald E. Dick; Randall M. Pierson; David A. Asson, all of Boulder, Colo.

[73] Assignee: Soricon Corporation, Boulder, Colo.

[21] Appl. No.: 563,705

[22] Filed: Aug. 7, 1990

[51] Int. Cl.$^5$ .............................................. H04B 1/00
[52] U.S. Cl. ................................. 340/825.51; 364/405
[58] Field of Search ................... 340/825.51; 364/404, 364/405; 235/7 R, 12

[56] References Cited

U.S. PATENT DOCUMENTS

| | | | |
|---|---|---|---|
| 4,249,648 | 2/1981 | Meyer | 364/405 |
| 4,771,382 | 9/1988 | Shiono et al. | 364/405 |
| 4,887,209 | 12/1989 | Sugishima | 364/405 |
| 4,887,210 | 12/1989 | Nakamura et al. | 364/405 |

Primary Examiner—Donald J. Yusko
Assistant Examiner—Dervis Magistre
Attorney, Agent, or Firm—Rosen, Dainow & Jacobs

[57] ABSTRACT

A system for inputting signals to a terminal includes a first interface having an input port, the first interface including a decoder for decoding the signals received at said port for application to the terminal. Two external sources of signals are OR'ed to the same port. One or both the sources may include an external input device and an interface for translating signals from a first code output from the input device to a second code which the first interface is adapted to accept. In order to OR the outputs of the sources, the sources may have open collector output transistors connected to a common collector resistor in the first interface.

13 Claims, 9 Drawing Sheets

INTERCONNECTION SYSTEM FOR AN ELECTRONIC CASH REGISTER

FIELD OF THE INVENTION

This invention relates to improvements in systems for interfacing peripherals to electronic cash registers.

BACKGROUND OF THE INVENTION

Electronic cash registers are conventionally employed to register and process sales information, to enable more rapid and effective treatment of sales data. Referring to FIG. 1, a conventional electronic cash register 10 is generally comprised of a terminal 11, which in its simplest form may be a repackaged personal computer. The cash register includes a keyboard 12 for entering sales or other pertinent data, as well as a display 13 for displaying any desired information that has been processed by the terminal. It is of course apparent that other I/0 devices, such as a printer (not shown) for providing a hard copy of sales data, is preferably also provided in such a system.

It is frequently desired to enable input of data to the terminal from other sources, such as a bar code reader, a magnetic stripe reader, a laser gun, an optical character reader, etc. For this purpose, a decoder interface 14, known as a "wedge", may be connected to the terminal via the keyboard port of the terminal. In such an arrangement, the keyboard 12 is connected to the terminal via the wedge 14, as illustrated in FIG. 1, rather than directly to the terminal. The term "wedge", in its specific sense, refers to the injection of data in the keyboard connection. The term "decoder" is a generic term that refers more generally to the decoding of signals resulting from the scanning of bar codes, including keyboard wedges or other connections such as the OCIA port on NCR electronic check readers. These two terms will be used interchangeably in the present disclosure, however, since they are used interchangeably in the industry. The wedge is adapted to be connected to one or more external input devices 15 for conversion of the output of the external device to a form that can be employed by the terminal. In this arrangement, the wedge 14 combines the outputs from the keyboard and from the external device(s), and sends the composite output signal to the electronic cash register terminal. The terminal cannot tell the difference between signals received from the keyboard, and signals received from the external device.

A typical wedge of this type is the Scanteam 2100 or 2120 decoder manufactured by Welch Allyn of Skaneateles Falls, N.Y. 13153, which is provided with a port for interfacing a wand or laser scanner, a port for interfacing magnetic slot readers, and an optional RS232 port. In addition, this device has an internal program enabling it to be configured to a particular application, in a setup procedure, to convert known outputs from an external device to desired codes for application to the terminal. Model 350 and 385 wedges manufactured by Symbol Technology Co. of Bohemia N.Y. are similar types of wedges.

While a wedge of this type is suitable for interfacing external devices for which it was designed, its universal adaptability to interface a number of different types of external devices necessarily increases its complexity and price. Such an increased price may not be cost effective in some point of sale operations, where universality of application is not required.

For example, as illustrated in FIG. 2, the wedge 14' may be provided with an MSR input port for receiving signals from a magnetic stripe reader 16, a scanner port for receiving signals from a scanner 17, and an auxiliary port for receiving RS232 signals from a check reader 18, such as the CR-1 check reader produced by the assignee of the present application. In this arrangement, the inclusion of the RS232 auxiliary port on the wedge adds extra cost to the wedge. In the event that the user had previously employed a wedge that did not have an RS232 port, the addition of the check reader 18 to the system may require the user to obtain a completely new wedge, since retrofitting of the presently available wedge may not be possible.

In order to avoid a requirement to obtain a new universal wedge, the user may have the alternative, as illustrated in FIG. 3, of still employing the previous wedge 14", without the additional auxiliary port, and instead purchasing a wedge 19 that is provided with an RS232 port. This output of this additional wedge is connected, as illustrated, in series with the outputs of the keyboard and the existing wedge 14'. While this solution may be less costly than that of FIG. 2, it still requires the user to purchase an additional wedge. It must be stressed that designing a wedge is a quite complex process, and hence the designing of a wedge adaptable to all terminals, keyboards and devices may not be economically feasible.

In an alternative arrangement for interfacing an external device 15 to the terminal 11, as illustrated in FIG. 4, the interface may be comprised of a decoder 20 adapted to be connected directly to a port 21 of the terminal, other than the keyboard port. In this arrangement, the interconnection between the keyboard and terminal is not modified. The decoder 20 combines the outputs from one or more external devices 15, and sends the composite signal to the special input port of the terminal. This arrangement also enables the terminal to send data and control signals to the decoder. The arrangement has the disadvantage, however, that a special port is required on the terminal. With this arrangement it is still necessary to buy a decoder, and the decoder may not be adapted for RS232 input. In such cases it may thus be necessary to install hardware with an additional port for the electronic check reader, and to purchase an additional wedge. This results in increased costs to the user, and inhibits the user from employing lower cost unmodified conventional terminals.

SUMMARY OF THE INVENTION is therefore directed to the provision of means for simplifying the interfacing of external input devices to a terminal, as well as to reduce the cost of interfacing the external input device.

Briefly stated, in accordance with the invention, in order to enable the use of an external input device with a wedge or other terminal interface device, wherein the wedge does not have adequate or sufficient input ports, and where another external input device is connected to one of the input ports of the interface, the outputs of the two external input devices are OR'd to the common port of the interface. This interconnection may be readily effected by providing each of the devices with an open collector output driver, with a common collector resistor being provided in the interface.

In accordance with a further embodiment of the invention, a second interface is provided for a system as above described, for interfacing the second external device to the port, wherein the output code of the second device is not acceptable to the port. This second interface includes an arrangement for translating the output of the second device to a code acceptable by the first interface.

The invention enables the interfacing of one or more external input devices to a terminal with a minimum of effort and cost.

BRIEF DESCRIPTION OF THE DRAWING

In order that the invention may be more clearly understood, it will now be disclosed in greater detail with reference to the accompanying drawings, wherein.

DETAILED DISCLOSURE OF THE INVENTION

Figure 5:
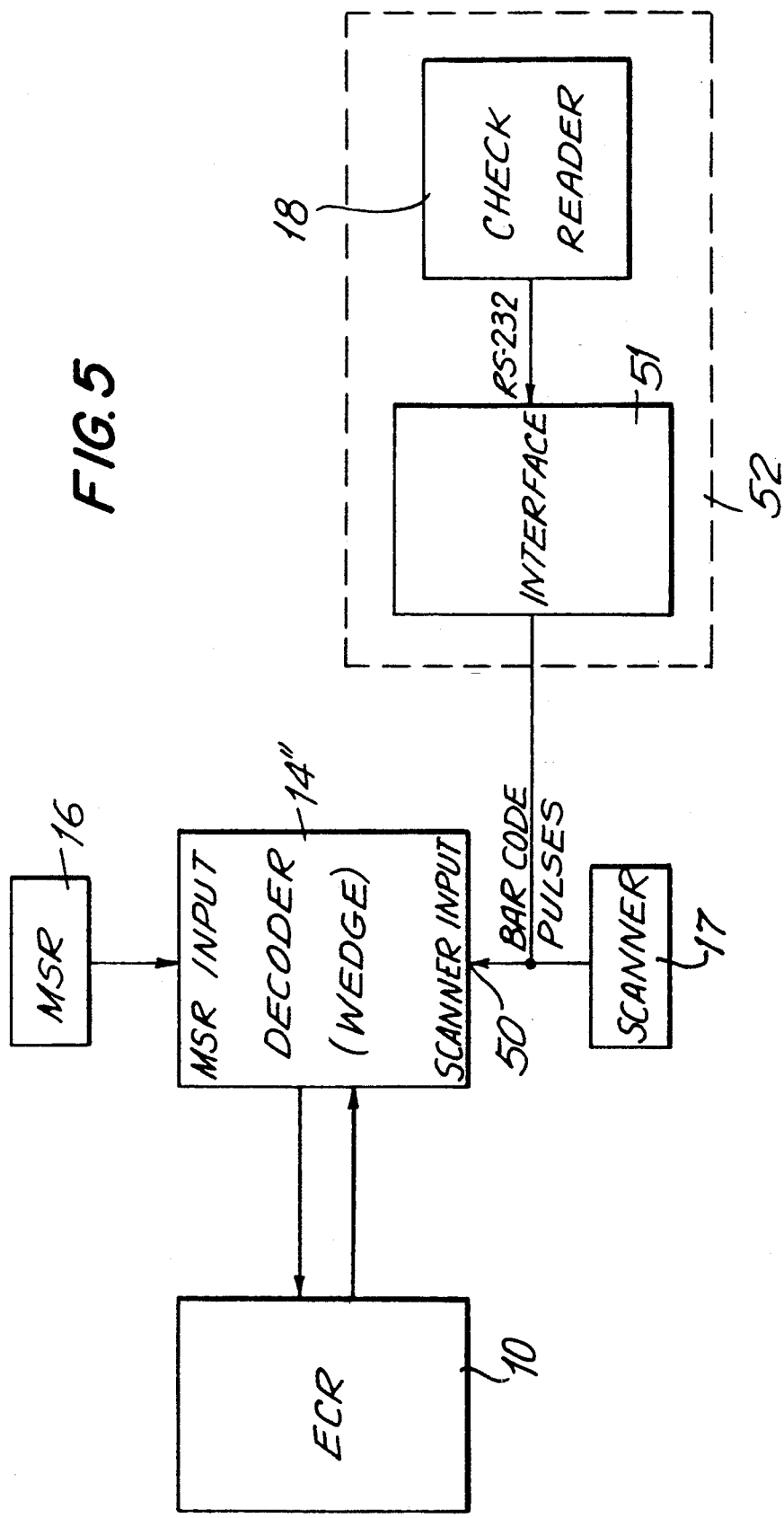
FIG. 5 is a block diagram of a system for interfacing external devices with a terminal, in accordance with the invention.

Referring now to FIG. 5, therein is illustrated a block diagram of a system in accordance with the invention for interfacing external input devices to a terminal via a decoder or wedge 14", wherein the wedge has a less than sufficient number of ports for the given application, or the ports are not directly adaptable to receiving the outputs of a given external device. In this arrangement, the selected wedge 14" has a port adapted to be connected to a magnetic strip reader 16, and a port 50 adapted to be connected to a bar code scanner 17 that outputs conventional bar code signals. The wedge 14" may be of the type, as described above, which has a program which enables it to be configured to a particular application, in a setup procedure, to convert known outputs from an external device to desired codes for application to the terminal.

As illustrated in FIG. 5, the arrangement includes an external device comprising a check reader 18 and an interface circuit 51, which may be assembled in a common enclosure 52. The check reader 18 outputs RS232 signals to the interface circuit 51, and the interface 52 translates these signals to a code recognized by the wedge 14" at the port 50, e.g. bar code pulses. The output of the interface is directly coupled to the port 50, in parallel with the output of the scanner 17, i.e. the outputs of the scanner and check reader interface 52 are OR'd to the port 50 of the wedge.

Figure 6:
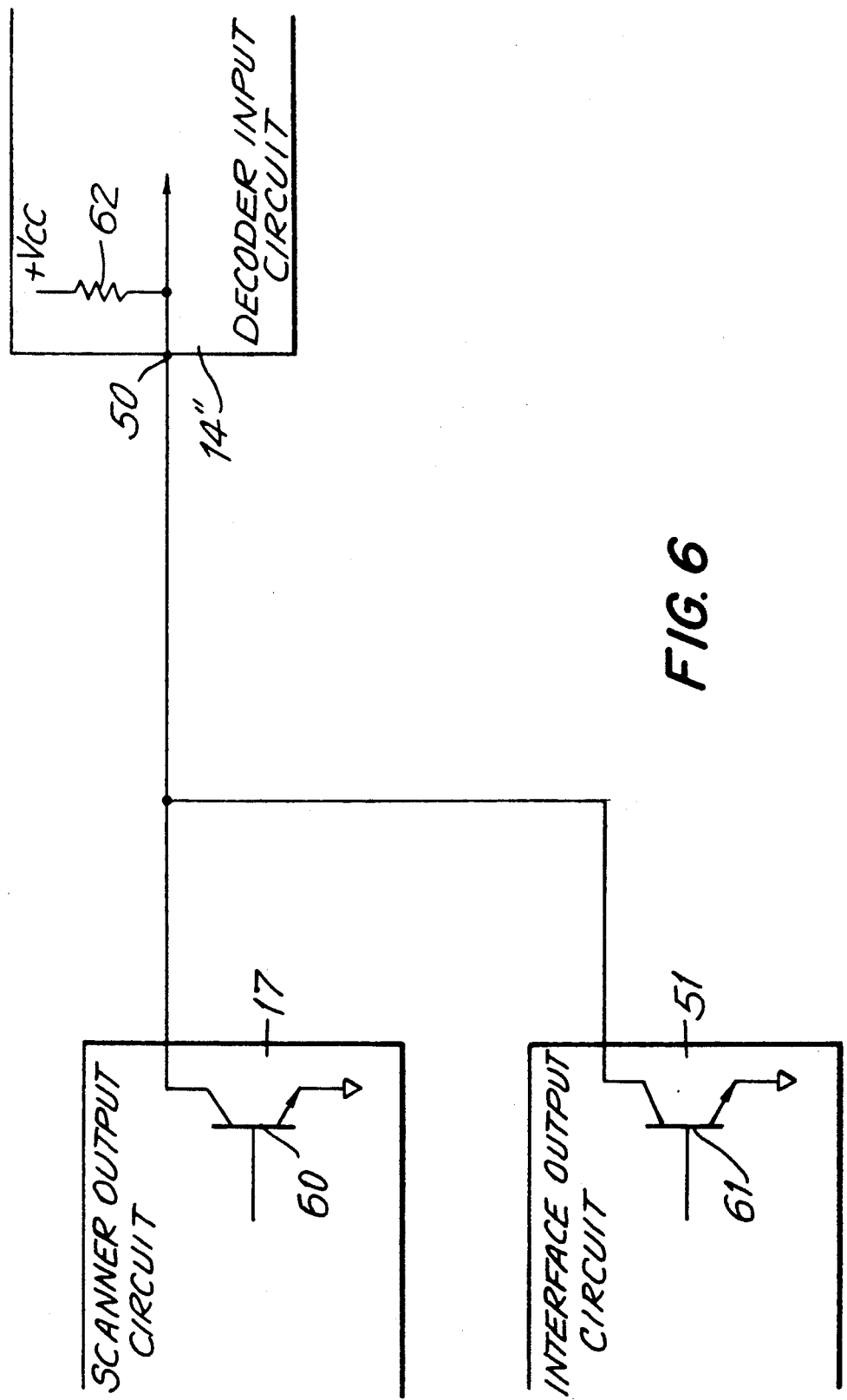
FIG. 6 is a more detailed circuit diagram of the arrangement for coupling the external devices in common to an interface.

This interconnection is shown in greater detail in FIG. 6, wherein it is seen that the output circuits of the scanner 17 and interface 51 include open collector transistors 60, 61, and a common collector resistor 63 is provided in the input circuit at port 50 of the wedge 14". As a result of the provision of open collector circuit outputs in the scanner and interface, these circuits will not interfere with one another. Thus, when the scanner is inactive, as it conventionally will be when the check reader is being used, the bar code output of the check read can be received by the wedge without interference. Similarly, when the check reader is inactive, as it will conventionally be when the scanner is being used, the wedge can receive bar code signals from the scanner 17 without interference from the check reader.

Figure 1:
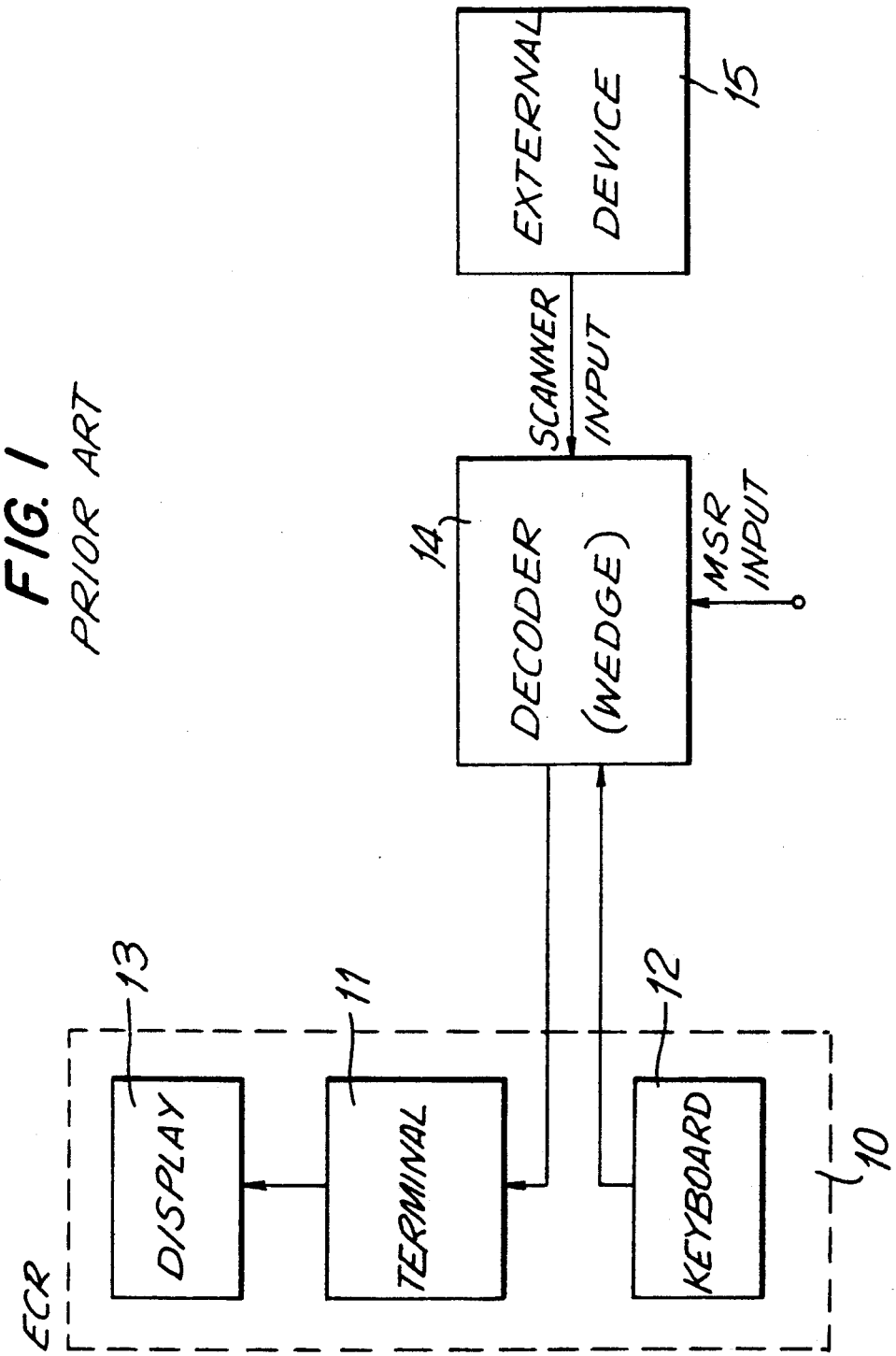
FIG. 1 is a block diagram of a known system for interfacing external devices with a terminal.
Figure 2:
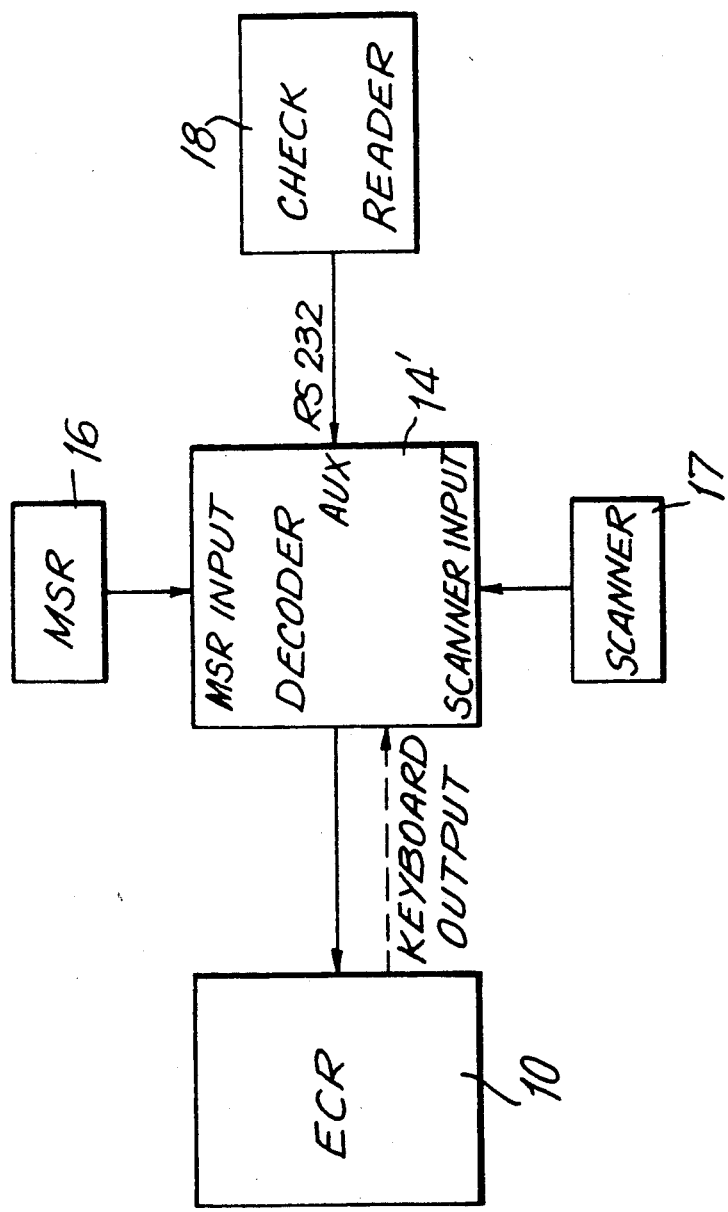
FIG. 2 is a block diagram of a modification of the system of FIG. 1.
Figure 3:
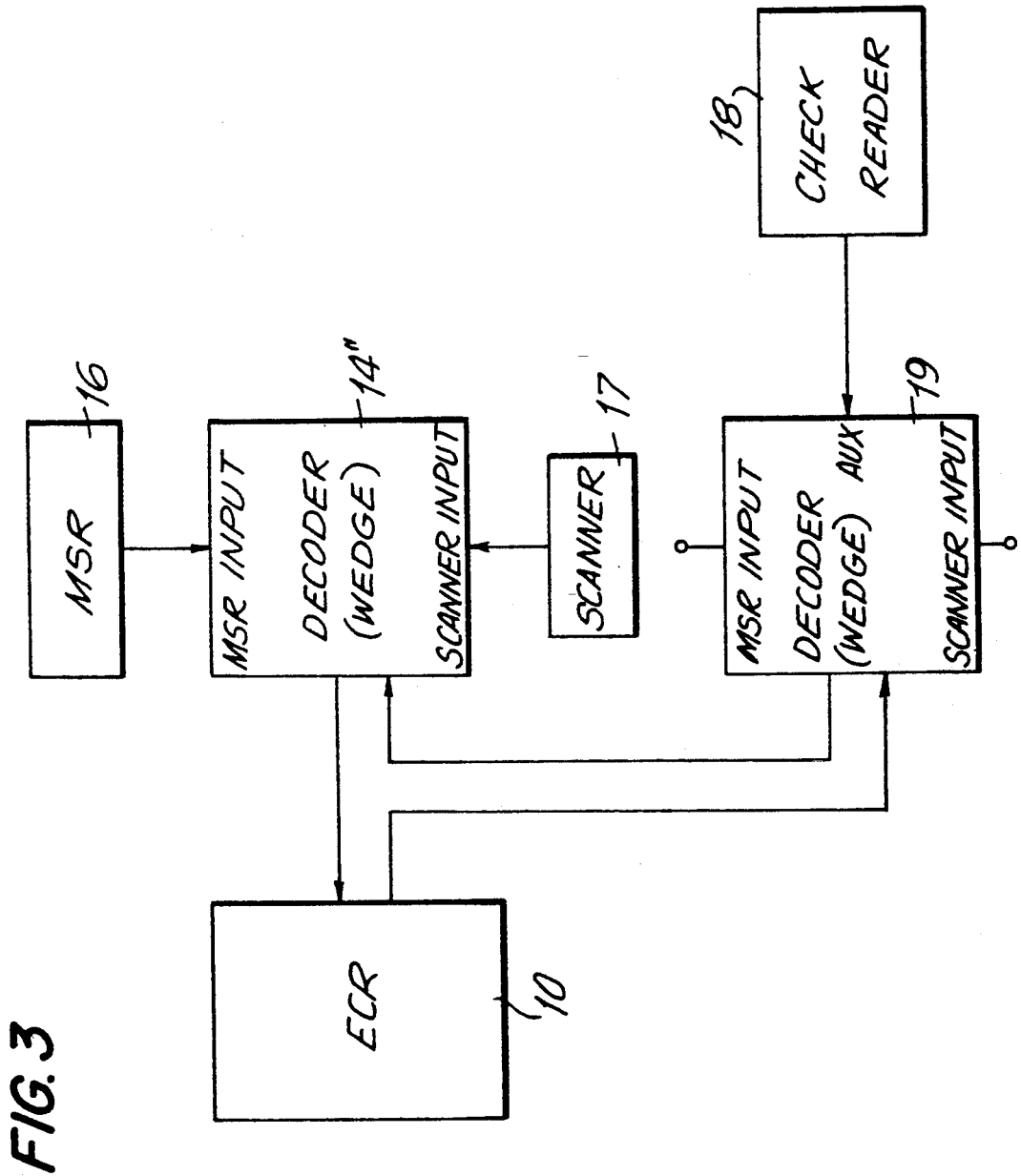
FIG. 3 is a block diagram of a further modification of the system of FIG. 1.
Figure 4:
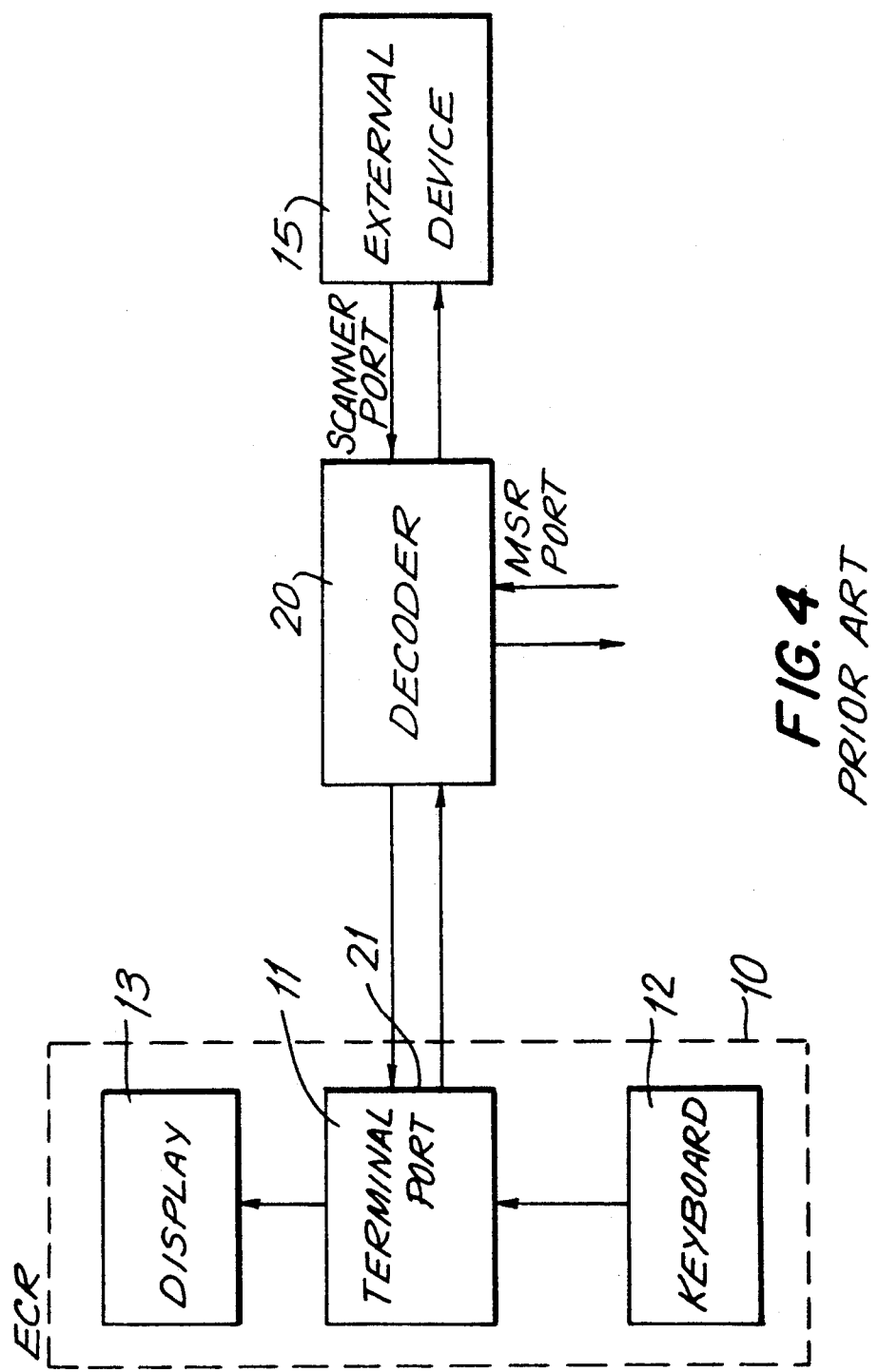
FIG. 4 is a block diagram of a still further modification of the system of FIG. 1.

While FIG. 5 illustrates only the embodiment of the invention employing a keyboard wedge, it will be apparent that the invention includes, within its scope, the use of a terminal interface adapted to be coupled to a special port of the terminal, as seen in FIG. 4.

It is of course apparent that the discussion, in the example, of converting the output signals from the check reader to bar code pulse signals is exemplary only, since the invention is not limited to this specific conversion. The interface 51 thus may be configured, in accordance with conventional practice, to output signals of the type that are acceptable to the given port of the wedge. It is further apparent that the invention is not limited to the interfacing of a check reader in the above discussed, manner, since any other external device may be interfaced in this manner, in accordance with the invention. It is further apparent that other OR arrangements may be employed to combine the outputs of a plurality of external devices, within the scope of the invention, and that more than two signals may be combined in this manner.

The arrangement of FIG. 6, in accordance with the invention, thereby enables the use of a conventional wedge, or terminal interface circuit, in combination with external devices other than those for which it is specifically designed, and it also enables the use of the ports of such a wedge to receive signals from more than one external device, without any expectation of interference between the external devices in normal use. As a consequence, the cost to a user of providing additional external input devices for a terminal, or providing external devices to which an available wedge is not compatible, is substantially reduced.

Figure 7:
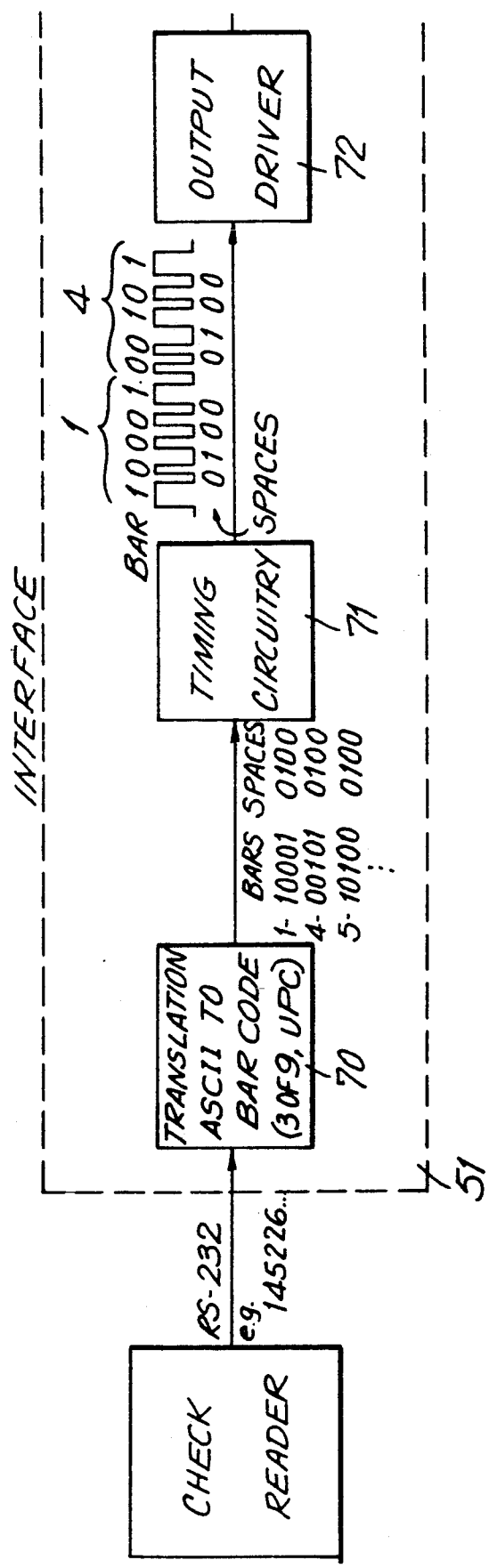
FIG. 7 is a simplified block diagram of an external device interface in accordance with one embodiment of the invention.

FIG. 7 is a simplified block diagram of an external device interface, in accordance with one embodiment thereof. In this arrangement, RS232 signals from the check reader 18 are applied to a translation circuit 70, which translates the ASCII signals from the check reader to bar code, e.g. 3 of 9. This conversion is effected in conventional manner, and hence a detailed discussion of the techniques of the conversion is not necessary here. The bar code signals from the translation circuit are applied to a timing circuit 71, which is also of conventional construction, e.g. part of a microprocessor, to develop the serial bar code pulses corresponding to the output of the check reader. These bar code signal sequences are applied to the output driver 72, for providing the output of the interface. The output driver preferably includes an open collector output, as discussed above with reference to FIG. 6.

It is of course apparent that, alternatively, the functions for the interface for the check reader or other external input device may be effected by a programmed microcomputer or microcontroller.

Figure 8:
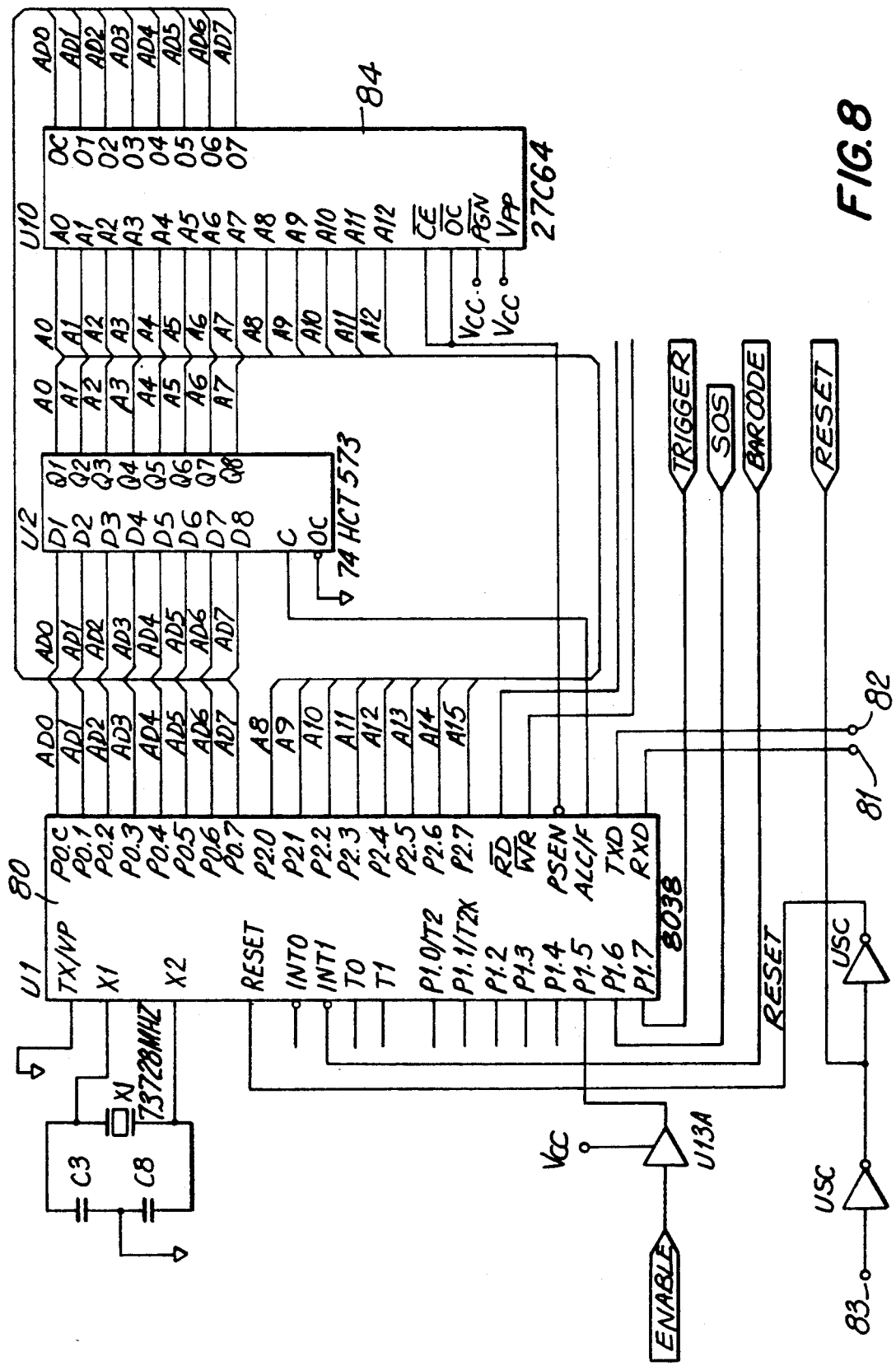
FIG. 8 is a schematic diagram of a first part of an interface for an external input device, in accordance with an embodiment of the invention.
Figure 9:
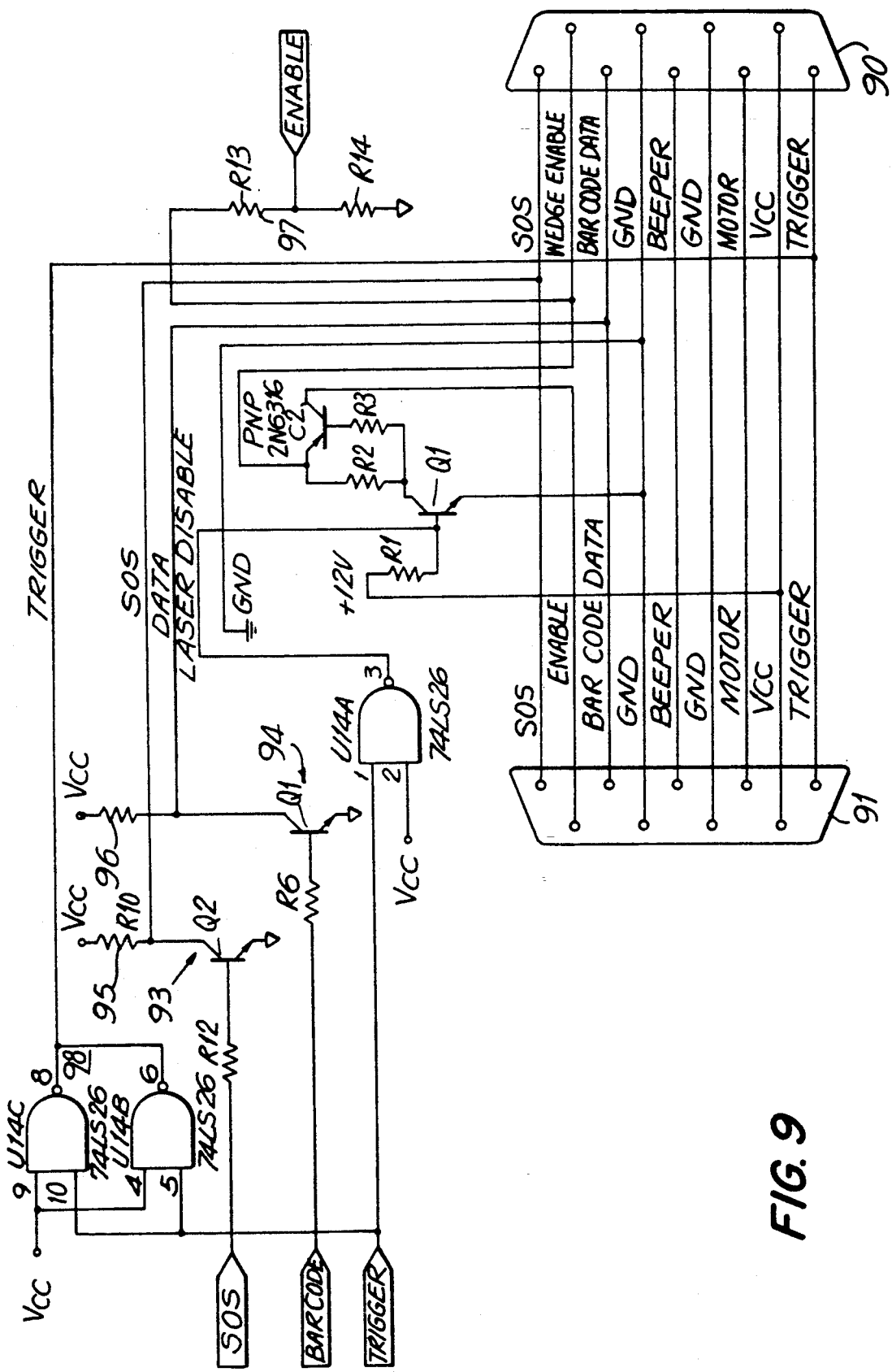
FIG. 9 is a detailed schematic diagram of the junction of the scanner output and the interface output, in accordance with the invention.

FIGS. 8-9 illustrate an embodiment of the external device interface in accordance with the invention, in greater detail. As illustrated in FIG. 8, the interface includes a microcontroller 80, such as an 8032 for controlling the system, performing any required code translations, as well as the timing functions. The microcontroller 80 receives data signal input, which may be in the form of serial RS232 signals, from the external input device such as a check reader, at the terminal 81. Output handshaking signals from the microcontroller to the external device may be transmitted from terminal 82, and reset signals from the external device may be received via the terminal 83. The internal program of the interface is stored in ROM 84. As seen in FIG. 8, the microcontroller outputs a trigger signal, an SOS signal (start of scan) and a bar code signal.

The bar code signal is a serial bar code signal that the microcontroller has generated in response to the input RS232 signal, under control of the ROM 84.

FIG. 9 illustrates a further portion of the circuit, having a connector 90 adapted to be connected to a wedge. The connections include:

1. An SOS line for signals sent from the external device indicating that a code sequence, such as a bar code sequence, is starting. As an example, when the signal is sent from a laser scanning gun, it indicates the reversal times of the scanning mirror. The program of the microcontroller 80 preferably simulates such repetitions of the code, in order that the signal is properly interpreted by the terminal.
2. A wedge enable signal from the wedge that is responsive to a trigger signal from an external input device, indicating to the external input device that the wedge is ready to receive signals, and also for supplying power to the laser scanner.
3. Bar code data signals from the external input devices to the wedge.
4. A trigger signal from the external input device, indicated that it is ready to transmit a coded data signal to the wedge.

The external input signals may originate in an external device coupled to the microprocessor, as indicated in FIG. 8, or from a device such as a laser scanner (not shown) coupled to the connector 91 (FIG. 9). The circuit of FIG. 9 includes a blocking circuit 92 responsive to an inverted trigger signal from the microcontroller, when the microcontroller is about to output data signals to the wedge, that block the wedge enable signal to the connector 91. This circuit prevents undesired response of a laser scanner connected to the connector 91, in response to a trigger signal generated in the microcontroller.

As illustrated in FIG. 9, the bar code and SOS signals are applied to the wedge from the microcontroller via transistor amplifiers 93 and 94 respectively. While these transistors are provided with resistors 95, 96 connected to their collectors, the resistors are in parallel with similar resistors in a laser scanner connected to the connector 91, and resistors in the wedge. The resistors 95, 96 are hence dimensioned to produce an OR function, when combined with the other resistors paralleled thereto.

The wedge enable signal applied to the interface from the wedge is directed to a divider 97 to derive the enable signal for the microcontroller. The circuit is further provided with a pair of NAND gates 98 to enable a sufficient drive for the trigger signal from the microcontroller.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. In an electronic cash register system for applying the output of a first external input device to a terminal via an encoder, said first external input device outputting signals in accordance with a given code, wherein a decoder has a port adapted to receive signals from said external input device, and the decoder is connected to decode the signals from the first input device and apply them to the terminal, the improvement comprising a source of additional output signals from a plurality of external input devices, and means for ORing the additional output signals and the output of said first external input device to said port, said means for ORing connected to said plurality of external input devices, said first external input device and decoder.

2. The system of claim 1 wherein said means for ORing comprising an open collector transistor output driver in each of said external input device and source of additional signals, the collectors of said transistors being connected to a common collector resistor in said decoder.

3. The system of claim 1 wherein said decoder comprises a keyboard wedge.

4. The system of claim 1 wherein said source of additional signals comprises a second external input device and an interface circuit for translating output signals from said second external input device to said given code.

5. The system of claim 5 wherein said given code is a bar code, said second external input device comprises means for output an RS232 signal, and said interface comprises means for converting RS232 signals to bar code signals.

6. A system for interfacing peripherals to an electronic cash register comprising an interface for coupling a source of data signals of a first code representative of input signals from a first external input device to a terminal keyboard wedge adapted to receive a second code representative of signals from a second external input device, comprising means adapted to be coupled to said source for translating signals of said first code to signals of said second code, and an open collector transistor driver connected to output said translated signals from said interface.

7. The interface of claim 6 wherein said means for translating comprises means for translating from RS232 code to a bar code.

8. A system for intefacing peripherals for an electronic cash register comprising a terminal system having a terminal, an interface connected to said terminal for applying input signals from said interface thereto, said interface having a port for receiving input signals, first and second sources of input signals that have separate outputs, first and second external input devices and means for ORing said separate outputs to said port.

9. The terminal system of claim 8 wherein said interface is a keyboard wedge.

10. The terminal system of claim 8 wherein said first source of input signals comprises an external input device, and a second interface connected to translate signals from a first code to a second code, said second source comprising means for outputting signals of said second code.

11. The terminal system of claim 8 wherein said separate outputs comprise open collector outputs, and said means for ORing comprises a common collector resistor in said interface and connected to each of said open collector outputs.

12. A system for interfacing peripherals for an electronic cash register comprising means for coupling first and second external input devices to a terminal via a keyboard wedge having a port for receiving signals of a first code, said first and second external input devices comprising means for outputting signals of said first code and a second code, respectively, said means comprising means for translating the output of said second external device to said first code, and means for ORing the output of said first device with the translated output of said second device for application to said port.

13. A system for interfacing peripherals for an electronic cash register comprising an interface for coupling first and second sources of data to a terminal wedge, wherein the source of data generate trigger signals for signalling that they are ready to send data signals, and the terminal wedge generates an enable signal in response to reception of trigger signals, the improvement where said interface has first and second ports for connection to said first and second sources of data, respectively, a third port for connection to said wedge, means for applying data signals and trigger signals at said first and second ports to said third port, first and second signal paths for applying enable signals received at said third port to said first and second ports, respectively, and means responsive to a trigger signal at said first port for inhibiting application of an enable signal responsive thereto to said second port.

* * * * *